US011734354B2

United States Patent
Chimakurthi et al.

(10) Patent No.: US 11,734,354 B2
(45) Date of Patent: *Aug. 22, 2023

(54) TRANSPARENT INTEGRATION OF MACHINE LEARNING ALGORITHMS IN A COMMON LANGUAGE RUNTIME ENVIRONMENT

(71) Applicant: Mastercard International Incorporated, Purchase, NY (US)

(72) Inventors: Sandeep Chakravarthy Chimakurthi, Ellisville, MO (US); Matthew Edward Hopkins, St. Charles, MO (US); Stephen G. Schwent, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,625

(22) Filed: Nov. 30, 2021

(65) Prior Publication Data
US 2022/0171771 A1 Jun. 2, 2022

Related U.S. Application Data

(60) Provisional application No. 63/119,167, filed on Nov. 30, 2020, provisional application No. 63/119,198, filed on Nov. 30, 2020.

(51) Int. Cl.
*G06F 16/00* (2019.01)
*G06F 16/903* (2019.01)
(Continued)

(52) U.S. Cl.
CPC ...... *G06F 16/90335* (2019.01); *G06F 16/248* (2019.01); *G06F 16/2443* (2019.01);
(Continued)

(58) Field of Classification Search
CPC .......... G06F 16/90335; G06F 16/2443; G06F 16/2448; G06F 16/248; G06F 16/252; G06N 5/02
(Continued)

(56) References Cited

U.S. PATENT DOCUMENTS 6,920,458 B1 7/2005 Chu et al.
7,689,572 B2 3/2010 Chu et al.
(Continued)

OTHER PUBLICATIONS

Akdere, Mert, et al., The Case for Predictive Database Systems: Opportunities and Challenges, CIDR. (vol. 2011, pp. 167-174) (dated Jan. 9, 2011).

*Primary Examiner* — Michelle N Owyang
(74) *Attorney, Agent, or Firm* — Hovey Williams LLP

(57) ABSTRACT

A computer system includes a processor and a database. The database includes a plurality of business intelligence (BI) data objects. Each of the BI data objects is associated with one or more data parameters. The processor is programmed with computer-executable instructions that cause the processor to run user code associated with a runtime environment that is hosted on the database. The user code includes executable source code that is not an intrinsic part of the database. The user code is created and deployed into the database and is configured to intercept a data call from a query application to a query interface for data corresponding to one or more of the BI data objects. The data call includes one or more selected parameters. The data call is parsed to ascertain the one or more selected parameters. Data corresponding to the one or more BI data objects is obtained from the database based on the one or more selected parameters. A data prediction result is appended to the obtained data.

11 Claims, 7 Drawing Sheets

(51) Int. Cl.
*G06F 16/242* (2019.01)
*G06F 16/248* (2019.01)
*G06F 16/25* (2019.01)
*G06N 5/02* (2023.01)

(52) U.S. Cl.
CPC ........ *G06F 16/2448* (2019.01); *G06F 16/252* (2019.01); *G06N 5/02* (2013.01)

(58) Field of Classification Search
USPC .................................................. 707/600–899
See application file for complete search history.

(56) References Cited

U.S. PATENT DOCUMENTS

| | | | |
|---|---|---|---|
| 7,809,729 B2 | 10/2010 | Chu et al. | |
| 8,160,977 B2 | 4/2012 | Poulin | |
| 8,311,967 B1 | 11/2012 | Lin et al. | |
| 8,521,664 B1 | 8/2013 | Lin et al. | |
| 8,533,660 B2 | 9/2013 | Mehr et al. | |
| 11,256,985 B2* | 2/2022 | Regev | G06N 3/045 |
| 11,321,320 B2* | 5/2022 | Azaria | G06N 3/08 |
| 2012/0131546 A1* | 5/2012 | Van Velzen | G06F 8/20 |
| | | | 717/106 |
| 2013/0091120 A1* | 4/2013 | Ganjam | G06F 16/2458 |
| | | | 707/769 |
| 2014/0101178 A1* | 4/2014 | Ginter | G06F 16/334 |
| | | | 707/755 |
| 2018/0043182 A1 | 2/2018 | Wu et al. | |
| 2019/0179940 A1* | 6/2019 | Ross | G06F 16/953 |
| 2020/0042647 A1* | 2/2020 | Pandey | G06N 20/00 |
| 2020/0341987 A1* | 10/2020 | Wright | G06N 20/00 |

* cited by examiner

TRANSPARENT INTEGRATION OF MACHINE LEARNING ALGORITHMS IN A COMMON LANGUAGE RUNTIME ENVIRONMENT

CROSS-REFERENCE TO RELATED APPLICATIONS

This application claims the priority benefit of identically-titled U.S. Provisional Patent Application Ser. No. 63/119,198, filed Nov. 30, 2020, and U.S. Provisional Patent Application Ser. No. 63/119,167, filed Nov. 30, 2020, and entitled DATABASE QUERY INTERFACE EXTENSION FOR MACHINE LEARNING ALGORITHMS IN BUSINESS INTELLIGENCE APPLICATIONS. The entire disclosure of each of the aforementioned priority applications is incorporated herein by reference.

FIELD OF THE DISCLOSURE

The field of the disclosure relates generally to a payment card and, more particularly, to a payment card having an access-controlled security element thereon.

BACKGROUND

In current database systems, for a machine learning algorithm to be used to make data predictions, a custom application operable with the specific database system is required to be built. The custom application may then be used for making data predictions. However, if the prediction request needs to be modified or updated, the process of generating a new, custom application must be performed.

Writing custom applications results in excessive complexity in using and integrating artificial intelligence and machine learning algorithm output into existing applications and deriving business intelligence data from those applications. Furthermore, data analysts, database developers, etc. must write custom software to use prediction results obtained from the custom applications and this typically renders vendor tools non-compatible or adds on a large custom built software solution that results in operational complexities of maintenance and support.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer system is provided. The computer system includes a database storing a plurality of business intelligence (BI) data objects. Each of the BI data objects is associated with one or more data parameters. The computer system also includes a processor programmed with computer-executable instructions. The computer-executable instructions cause the processor to run user code associated with a runtime environment that is hosted on the database. The user code includes executable source code that is not an intrinsic part of the database. The user code is created and deployed into the database and is configured to intercept a data call from a query application to a query interface for data corresponding to one or more of the BI data objects. The data call includes one or more selected parameters. The user code is further configured to parse the data call to ascertain the one or more selected parameters and to obtain the data corresponding to the one or more BI data objects based on the one or more selected parameters. Moreover, the user code is configured to append a prediction result to the obtained data.

In another aspect, a computer-implemented method is provided. The computer-implemented method is executable on a computer system including a processor and a memory. A plurality of business intelligence (BI) data objects is persisted in a database stored in the memory. Each of the BI data objects is associated with one or more data parameters. The method includes deploying user code into the database. The user code is associated with a runtime environment that is hosted on the database. The user code includes executable source code that is not an intrinsic part of the database. The method also includes creating a database procedure based on the user code and invoking the database procedure. The database procedure causes the processor to intercept a data call from a query application to a query interface for data corresponding to one or more of the BI data objects. The data call includes one or more selected parameters. The database procedure also causes the processor to parse the data call to ascertain the one or more selected parameters. Furthermore, the database procedure causes the processor to obtain the data corresponding to the one or more BI data objects based on the one or more selected parameters. Moreover, the database procedure causes the processor to append a prediction result to the obtained data.

In yet another aspect, a computer-readable storage medium is provided. The computer-readable storage medium includes computer-executable instructions stored thereon for use in a computer system in which a plurality of business intelligence (BI) data objects is persisted in a database. Each BI data object is associated with one or more data parameters. The computer system also includes a processor. The computer-executable instructions, when executed by the processor, cause the processor to run user code associated with a runtime environment that is hosted on the database. The user code includes executable source code that is not an intrinsic part of the database. The user code is deployed into the database and is configured to intercept a data call from a query application to a query interface for data corresponding to one or more of the BI data objects. The data call includes one or more selected parameters. In addition, the user code is configured to parse the data call to ascertain the one or more selected parameters. Furthermore, the user code is configured to obtain the data corresponding to the one or more BI data objects based on the one or more selected parameters. Moreover, the user code is configured to append a prediction result to the obtained data.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Exemplary System

Figure 1:
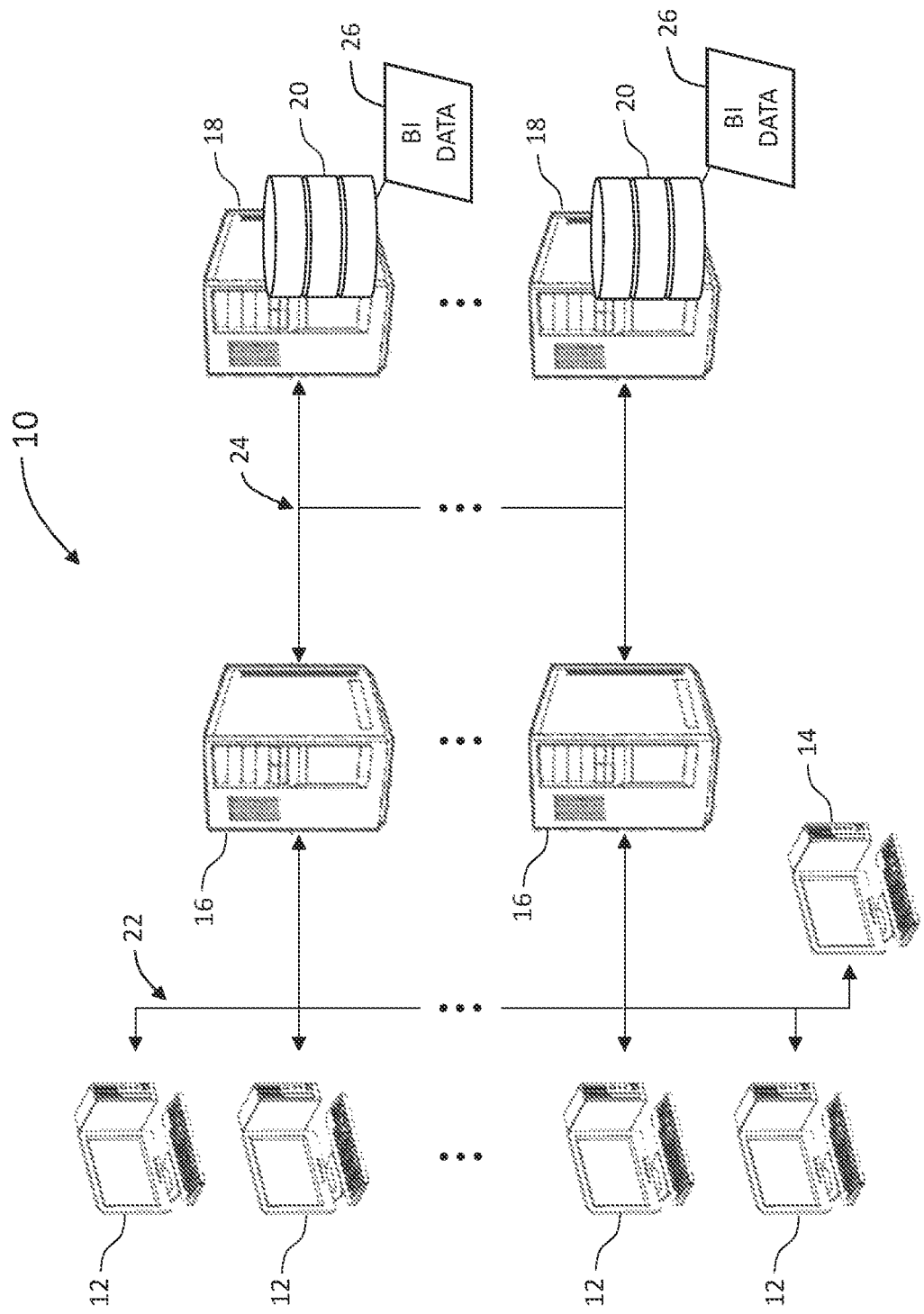
FIG. 1 is a schematic of an exemplary environment for querying databases, according to one aspect of the present invention.

FIG. 1 is a schematic of an exemplary environment 10 for querying databases, according to one aspect of the present invention. The environment 10 includes, for example, a plurality of computing devices 12 and 14; a plurality of application servers 16; a plurality of database servers 18, each electronically interfaced to a one or more respective databases 20 (broadly, data sources); and a plurality of communication networks 22 and 24. In an example embodiment, the computing devices 12, 14 and the application servers 16 may be located within network boundaries (e.g., the network 22) of an organization, such as a business, a corporation, a government agency and/or office, a university, or the like. The communication network 24 and the database servers 18 may be external to the organization, for example, where the database servers 18 are provided by third-party data vendors managing the databases 20. It is noted that the location of the computing devices 12 and 14, the application servers 16, the database servers 18, and the databases 20 may all be located in a single organization or separated, in any desirable and/or selected configuration or grouping, across more than one organization (e.g., a third party vendor). For example, in an example embodiment, the computing devices 12 may be remote computing devices, each associated with a customer, electronically interfaced in communication to the application servers 16, which may be located within an organization. In addition, the database servers 18 and associated databases 20 may be located within a separate organization from the computing devices 12 and/or application servers 16. While depicted as separate networks, the communication networks 22 and 24 can include a single network system, such as the Internet.

In the exemplary embodiment, the computing devices 12, 14 and the application servers 16 are electronically interfaced in communication via the communication network 22. The communications network 22 includes, for example and without limitation, one or more of a local area network (LAN), a wide area network (WAN) (e.g., the Internet, etc.), a mobile network, a virtual network, and/or any other suitable private and/or public communications network that facilitates communication among the computing devices 12, 14 and the application servers 16. In addition, the communication network 22 is wired, wireless, or combinations thereof, and includes various components such as modems, gateways, switches, routers, hubs, access points, repeaters, towers, and the like. In some embodiments, the communications network 22 includes more than one type of network, such as a private network provided between the computing device 14 and the application servers 16, and, separately, the public Internet, which facilitates communication between the computing devices 12 and the application servers 16.

In one embodiment, the computing devices 12, 14 and the application servers 16 control access to the database servers 18 and/or databases 20 under an authentication framework. For example, a user of a computing device 12, 14, may be required to complete an authentication process to query the databases 20 via the applications servers 16 and/or database servers 18. As described above, in some embodiments, one or more of the computing devices 12, 14 may not be internal to the organization, but may be granted access to perform one or more queries via the authentication framework. One of ordinary skill will appreciate that the application servers 16 may be free of, and/or subject to different protocol(s) of, the authentication framework.

In the exemplary embodiment, the application servers 16 and the database servers 18/databases 20 are electronically interfaced in communication via the communication network 24. The communications network 24 also includes, for example and without limitation, one or more of a local area network (LAN), a wide area network (WAN) (e.g., the Internet, etc.), a mobile network, a virtual network, and/or any other suitable private and/or public communications network that facilitates communication among the application servers 16 and the database servers 18/databases 20. In addition, the communication network 24 is wired, wireless, or combinations thereof, and includes various components such as modems, gateways, switches, routers, hubs, access points, repeaters, towers, and the like. In some embodiments, the communications network 24 includes more than one type of network, such as a private network provided between the database servers 18 and the databases 20, and, separately, the public Internet, which facilitates communication between the application servers 16 and the database servers 18.

In the exemplary embodiment, the communication network 24 generally facilitates communication between the application servers 16 and the database servers 18. In addition, the communication network 24 may also generally facilitate communication between the computing devices 12 and/or 14 and the application servers 16, for example in conjunction with the authentication framework discussed above and/or secure transmission protocol(s). The communication network 22 generally facilitates communication between the computing devices 12, 14 and the application servers 16. The communication network 22 may also generally facilitate communication between the application servers 16 and the database servers 18.

In the exemplary embodiment, the computing devices 12, 14 include, for example, workstations, as described below. In the exemplary embodiment, the computing device 14 is operated by, for example, a developer and/or administrator (not shown). The developer builds applications at the computing device 14 for deployment, for example, to the computing devices 12 and/or the application servers 16. The applications are used by users at the computing devices 12, for example, to query data and/or data predictions based on the data stored in the databases 20. The administrator defines access rights at the computing device 14 for provisioning user queries to the databases 20 via the applications. In an example embodiment, the same individual performs developer and administrator tasks.

In the exemplary embodiment, each of the databases 20 preferably includes a network disk array (a storage area network (SAN)) capable of hosting large volumes of data. Each database 20 also preferably supports high speed disk striping and distributed queries/updates. It is also preferable that support for redundant array of inexpensive disks (RAID) and hot pluggable small computer system interface (SCSI) drives is supported. In one example embodiment, the databases 20 are not integrated with the database servers 18 to avoid, for example, potential performance bottlenecks.

Data persisted or stored in the databases 20 includes, for example, business intelligence (BI) data 26. BI data 26 includes, for example, a plurality of data objects including, for example, customer transaction data and/or other data, such as account data, merchant data, customer data, search data, social networking data, web data, etc., that can be used to develop intelligence information about individual customers, certain types or groups of customers, transactions, marketing programs, and the like. Each of the data objects comprising the BI data 26 is associated with one or more data parameters. The data parameters facilitate identifying and categorizing the BI data and include, for example, and without limitation, data type, size, date created, date modified, and the like. BI data 26 informs users, for example, of the computing devices 12, and facilitates enabling the users to improve operational efficiencies, products and/or services, customer marketing, customer retention, risk reduction, and/or the like. For example, in one embodiment, the application servers 16 are maintained by a payment network, and an authenticated employee of a business organization, such as a merchant, accesses, for example, a data query application or a prediction application implemented on the application servers 16 to query the databases 20. As an example, in an embodiment, the data query application or prediction application obtains customer transaction data to identify past or predict future fraudulent activities, voucher code use, promotion code use, rate code data, counter discount program data, and the like. An employee of the payment network may also access the application servers 16 from a computing device 12 or 14, for example, to query the databases 20, perform maintenance activities, and/or install or update applications, predictions models, and the like. One of ordinary skill will appreciate that embodiments may serve a wide variety of organizations and/or rely on a wide variety of data within the scope of the present invention.

Exemplary Computer Systems

Figure 2:
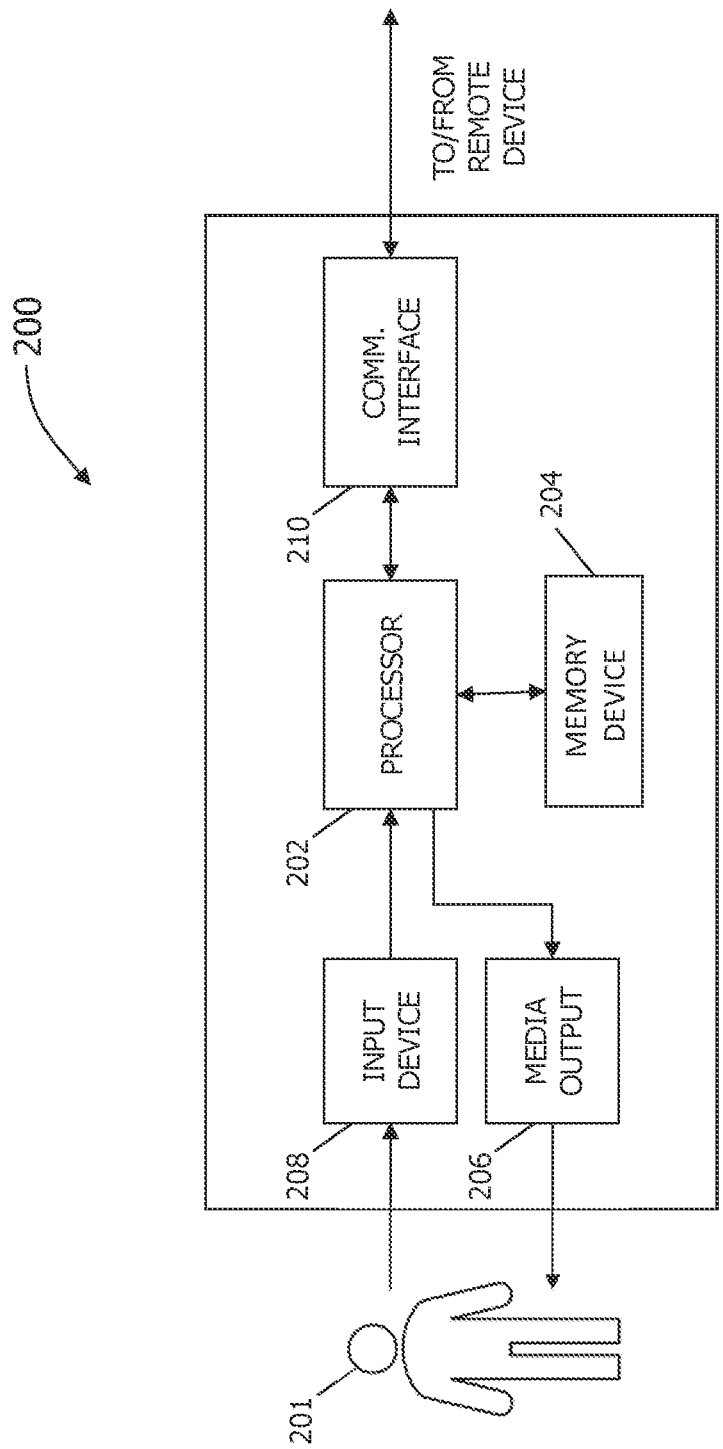
FIG. 2 is an example configuration of a computing system, such as the computing system shown in FIG. 1.

FIG. 2 is an example configuration of a computing system 200 operated by a user 201. In some embodiments, the computing system 200 is a computing device 12 and/or 14 (shown in FIG. 1). In the example embodiment, the computing system 200 includes a processor 202 for executing instructions. In some embodiments, executable instructions are stored in a memory device 204. The processor 202 includes one or more processing units, such as, a multi-core processor configuration. The memory device 204 is any device allowing information such as executable instructions and/or written works to be stored and retrieved. The memory device 204 includes one or more computer readable media.

In one example embodiment, the processor 202 is implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the environment 10 may, in some embodiments, provide a mechanism for automatically updating the software on the computing system 200. For example, an updating mechanism may be used to automatically update any number of components and their drivers, both network and non-network components, including system level (OS) software components. In some embodiments, the computing system components are dynamically loadable and unloadable; thus, they may be replaced in operation without having to reboot the OS.

The computing system 200 also includes at least one media output component 206 for presenting information to the user 201. The media output component 206 is any component capable of conveying information to the user 201. In some embodiments, the media output component 206 includes an output adapter such as a video adapter and/or an audio adapter. An output adapter is operatively coupled to the processor 202 and operatively connectable to an output device such as a display device, for example, and without limitation, a liquid crystal display (LCD), organic light emitting diode (OLED) display, or "electronic ink" display, or an audio output device such as a speaker or headphones.

In some embodiments, the computing system 200 includes an input device 208 for receiving input from the user 201. The input device 208 may include, for example, one or more of a touch sensitive panel, a touch pad, a touch screen, a stylus, a position detector, a keyboard, a pointing device, a mouse, and an audio input device. A single component such as a touch screen may function as both an output device of the media output component 206 and the input device 208.

The computing system 200 may also include a communication interface 210, which is communicatively connectable to a remote device such as the application servers 16 (shown in FIG. 1) via wires, such as electrical cables or fiber optic cables, or wirelessly, such as radio frequency (RF) communication. The communication interface 210 may include, for example, a wired or wireless network adapter or a wireless data transceiver for use with Bluetooth communication, RF communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 204 are, for example, computer readable instructions for providing a user interface to the user 201 via the media output component 206 and, optionally, receiving and processing input from the input device 208. A user interface may include, among other possibilities, a web browser and a client application. Web browsers enable users, such as the user 201, to display and interact with media and other information typically embedded on a web page or a website available from the application servers 16. A client application allows the user 201 to interact with a server application associated, for example, with the application servers 16.

Figure 3:
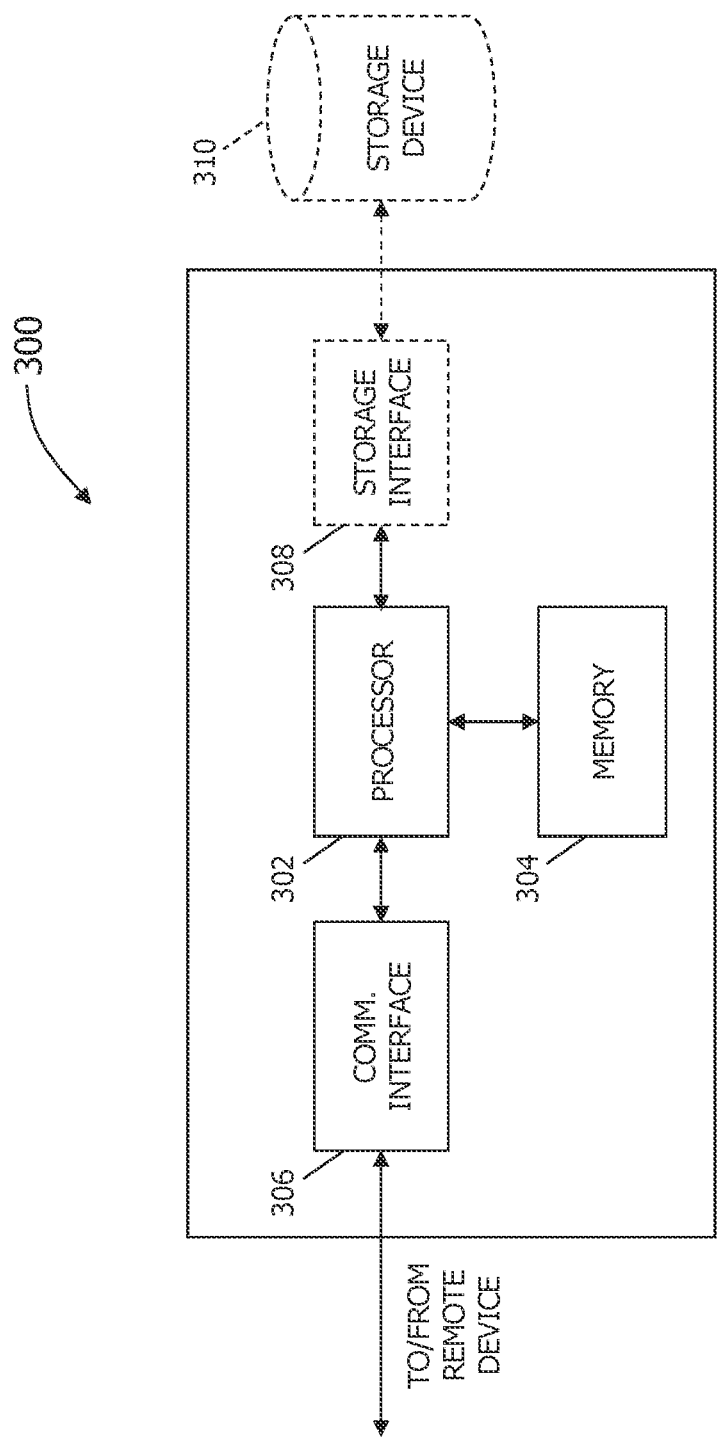
FIG. 3 is an example configuration of a server system, such as the server system shown in FIG. 1.

FIG. 3 is an example configuration of a server system 300. The server system 300 includes, but is not limited to, the application servers 16 (shown in FIG. 1) and the database servers 18 (shown in FIG. 1). In the example embodiment, the server system 300 includes a processor 302 for executing instructions. The instructions may be stored in a memory area 304, for example. The processor 302 includes one or more processing units (e.g., in a multi-core configuration) for executing the instructions. The instructions may be executed within a variety of different operating systems on the server system 300, such as UNIX, LINUX, Microsoft Windows®, etc. More specifically, the instructions may cause various data manipulations on data stored in a storage device 310 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). In the example embodiment, the processor 302 may be implemented as one or more cryptographic processors, as described above with respect to the computing system 200.

The processor 302 is operatively coupled to a communication interface 306 such that the server system 300 can communicate with a remote device such as a computing system 200 (shown in FIG. 2) or another server system. For example, the communication interface 306 may receive communications from one or more of the computing devices 12 or 14 via the network 22, and/or from one or more of the applications servers 16 via the communication network 24, as illustrated in FIG. 1. The communication interface 306 is connectable via wires, such as electrical cables or fiber optic cables, or wirelessly, such as radio frequency (RF) communication. The communication interface 306 may include, for example, a wired or wireless network adapter or a wireless data transceiver for use with Bluetooth communication, RF communication, near field communication (NFC), and/or with a mobile phone network, Global System for Mobile communications (GSM), 3G, or other mobile data network, and/or Worldwide Interoperability for Microwave Access (WiMax) and the like.

The processor 302 is operatively coupled to the storage device 310. The storage device 310 is any computer-operated hardware suitable for storing and/or retrieving data. In some embodiments, the storage device 310 is integrated in the server system 300, while in other embodiments, the storage device 310 is external to the server system 300. In the exemplary embodiment, the storage device 310 includes, but is not limited to, the database 20 (shown in FIG. 1). For example, the server system 300 may include one or more hard disk drives as the storage device 310. In other embodiments, the storage device 310 is external to the server system 300 and may be accessed by a plurality of server systems. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 is operatively coupled to the storage device 310 via a storage interface 308. The storage interface 308 is any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

The memory area 304 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Exemplary Query/Prediction Platform

Figure 4:
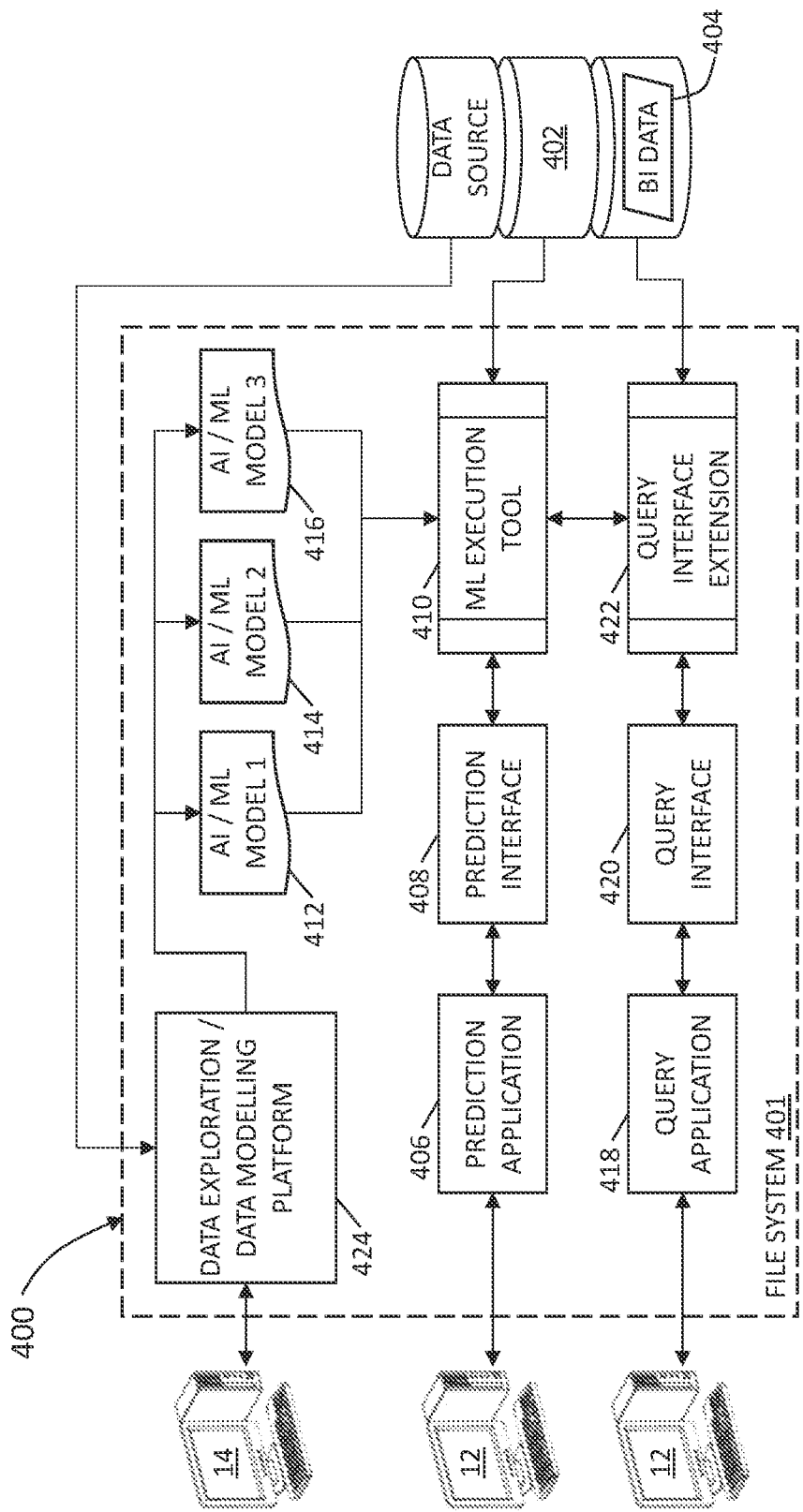
FIG. 4 is an architectural diagram of a database querying and prediction platform in accordance with aspects of the present invention.

FIG. 4 is an architectural diagram of a database querying and prediction platform 400 (otherwise referred to herein as the "platform 400" or the "DQP Platform 400") in accordance with aspects of the present invention. The diagram depicts various components of exemplary systems for querying data sources, such as a data source 402, and of relationships between the components. The platform 400, at a high level, operates on a file system 401 of a database server, such as the database server 18 (shown in FIG. 1). The platform 400 includes a plurality of the computing devices 12, 14. The computing devices 12 are utilized by a user (not shown) to transmit queries, via an application, to a respective interface system. The applications and/or interface systems may be deployed, for example, on an application server 16 (shown in FIG. 1) and/or the computing devices 12. The queries are configured to query historical data and/or data predictions based, for example, on BI data 404 persisted or stored in the data source 402.

For data predictions only, the platform 400 includes a prediction application 406 (e.g. an ODBC connection, custom application, etc.) configured to receive one or more selected parameters input by the user via a computing device 12. The prediction application 406 is electronically interfaced to a prediction interface 408, which is configured to receive a data prediction query from the prediction application 406. A machine learning (ML) execution tool 410 is electronically interfaced to the prediction interface 408, the data source 402, and a plurality of artificial intelligence (AI)/machine learning (ML) models, such as AI/ML models 412, 414, and 416. The ML execution tool 410 receives the data prediction query from the prediction interface 408, parses the data prediction query to ascertain the selected parameters input by the user, and based on the ascertained parameters, selects one or more of the AI/ML models 412, 414, and 416 for execution. The ML execution tool 410 retrieves relevant data, such as BI data 404, from the data source 402 and executes the selected model(s) using the ascertained parameters and BI data 404. The results (e.g., data predictions) are calculated and returned to the prediction interface 408, where they are presented to the user via the prediction application 406.

For a historical data query and/or a data prediction based on the same historical data query, the platform 400 includes a query application 418 (e.g. an ODBC connection, custom application, etc.) configured to receive the one or more selected parameters input by the user via a computing device 12. The query application 418 is electronically interfaced to a query interface 420, which is configured to receive a historical data query from the query application 418. A query interface extension 422 is electronically interfaced to the query interface 420, the data source 402, and the ML execution tool 410. The query interface extension 422 intercepts or otherwise receives the historical data query from the query interface 420, parses the historical data query to ascertain the selected parameters input by the user, and based on the ascertained parameters, determines whether a prediction model is available for the queried dataset. For example, the query interface extension 422 determines whether one or more of the AI/ML models 412, 414, and 416 are configured to be executed using the ascertained parameters. If a prediction model is available, the query interface extension 422 transmits the selected parameters to the ML execution tool 410 for generating a prediction result. In addition, based on the historical data query, the query interface extension 422 retrieves the queried historical data, such as BI data 404, from the data source 402 and appends the prediction result to the retrieved queried historical data. The results (e.g., the queried data and appended data predictions) are returned to the query interface 420, where they are presented to the user via the query application 418.

In one embodiment, the platform 400 optionally includes a data exploration/data modelling platform 424 electronically interfaced to a computing device 14 operated by, for example, a developer and/or analyst (not shown). The data exploration/data modelling platform 424 is also electronically interfaced to the data source 402. The developer and/or analyst develops AI/ML models, such as the AI/ML models 412, 414, and 416, using, for example, the BI data 404. For example, and without limitation, the developer and/or analyst selects certain BI data to be used for a new model. The data is selected, for example, based on a thorough analysis and understanding of the data. The selected data is prepared as training data and a model is generated therefrom. The trained model is evaluated and deployed as an AI/ML model available to the ML execution tool 410 for generating a prediction result.

Figure 5:
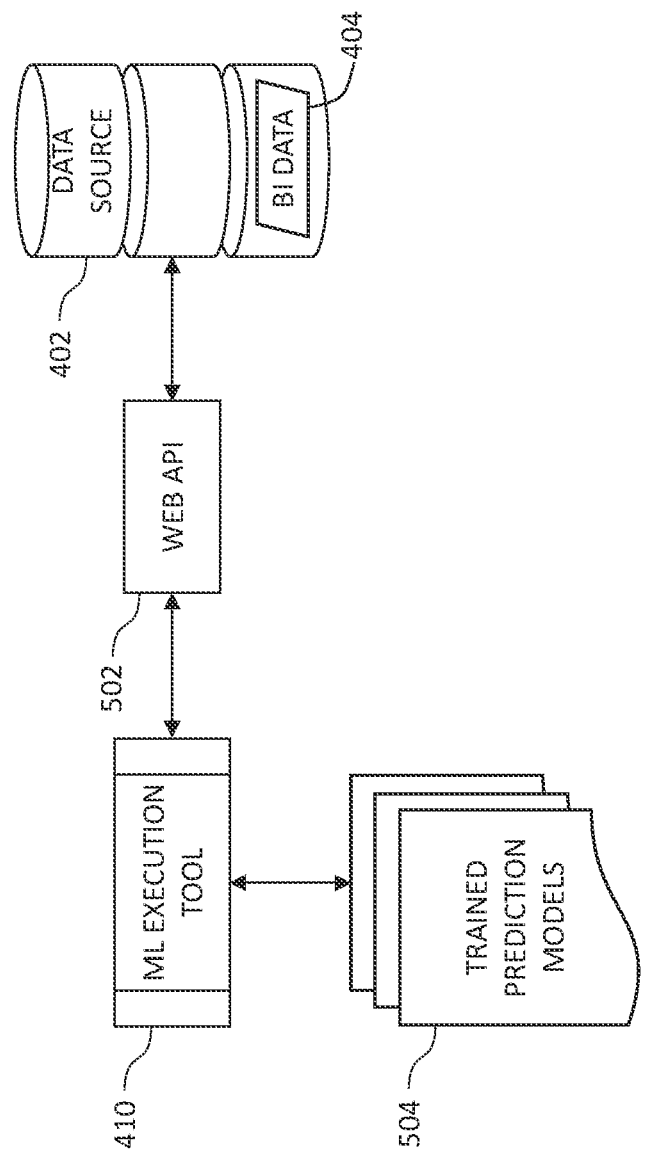
FIG. 5 is a component diagram of a machine learning execution tool shown in FIG. 4, according to one aspect of the present invention.

FIG. 5 is a component diagram of the ML execution tool 410, according to one aspect of the present invention. The ML execution tool 410 is electronically interfaced to a web application programming interface (API) 502 and a plurality of trained prediction models 504, such as the AI/ML models 412, 414, and 416 (shown in FIG. 4). The web API 502 may include and/or provide access to one or more pages or sets of data, such as BI data 404, and/or other content accessed through the World Wide Web (e.g., through the communication network 24) and/or through the internal network 22. In a preferred embodiment, the web API 502 is hosted by or stored on a web server and/or database server, for example. The web API 502 may be accessed using software such as a web browser, through execution of one or more script(s) for obtaining BI data, and/or by other means for interacting with APIs without departing from the spirit of the present invention.

Exemplary Computer-Implemented Method

Figure 6:
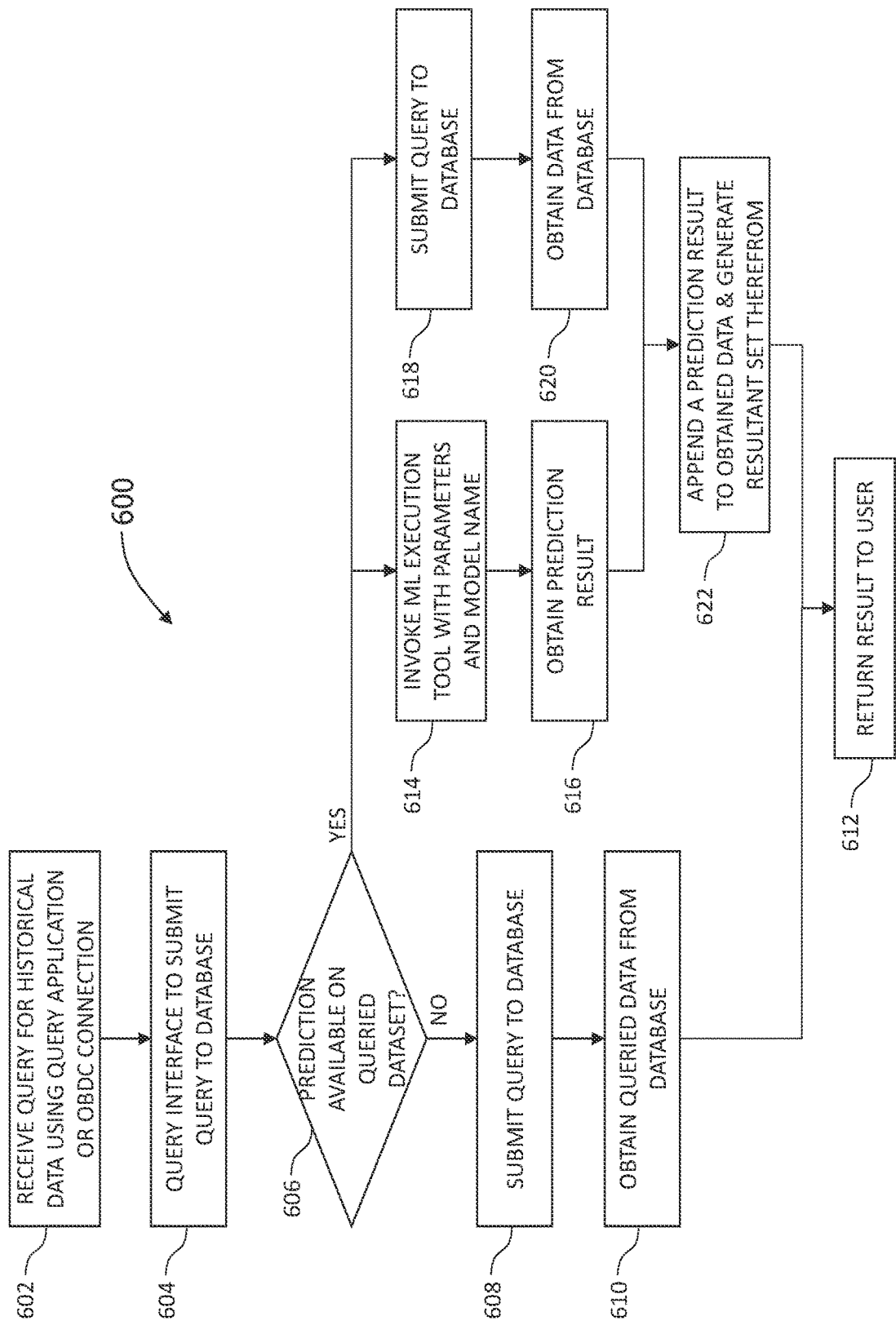
FIG. 6 is a flowchart illustrating an exemplary computer-implemented method for integrating a prediction model with a database server query, according to one aspect of the present invention.

FIG. 6 is a flowchart illustrating an exemplary computer-implemented method 600 for integrating a prediction model with a database server query, according to one aspect of the present invention. The operations described herein may be performed in the order shown in FIG. 6 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-5. In one embodiment, the computer-implemented method 600 is implemented by the DQP Platform 400 (shown in FIG. 4). In the exemplary embodiment, the computer-implemented method 600 relates to appending data prediction results to the results of an historical data query. While operations within the computer-implemented method 600 are described below regarding the DQP Platform 400, according to some aspects of the present invention, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 602, the platform 400 receives a data call or query for historical data contained in a database, such as the data source 402 (shown in FIG. 4). The query application 418 (shown in FIG. 4) or an OBDC connection calls the query interface 420 (shown in FIG. 4), passing a machine-readable query including one or more selected parameters to the query interface 420, which identifies the requested historical databased on matching the one or more selected parameters to one or more data parameters associated with the historical data. The one or more selected parameters of the query are input to the query application 418, for example, by a user (not shown). For example, in accordance with one aspect of the present invention, the machine-readable query is in a form required by the respective database software for identifying and retrieving data contained in the data source 402. The data source 402 may be implemented using various database software, including, for example, and without limitation, SQL Server, Oracle, DB2, and PostgreSQL. In a preferred embodiment, the data source 402 is implemented as an SQL Server database server. Below is an example machine-readable query in the form required by SQL Server:

```
select CDP_ID,Month(crte_DTTM), count(CDP_ID)
from [CDP].[LOGGING].[LOGS] where CDP_ID = 46
Group by CDP_ID, Month(crte_DTTM)
```

The machine-readable query is forwarded to the query interface 420, for example, by the query application 418. For example, in one embodiment, the query application 418 operates as a user interface for the query interface 420. As the one or more selected parameters are input into the query application 418, the query application 418 generates the machine-readable, which is automatically input/read by the query interface 420.

At operation 604, the query interface 420 recognizes the machine-readable query as formatted in an appropriate form and proceeds to submit the machine-readable query to the database, such as the data source 402. If the machine-readable query is formatted incorrectly or is otherwise unrecognizable, the query interface 420 rejects the query interface 420.

The query interface extension 422 intercepts or otherwise receives the machine-readable query. In the exemplary embodiment, the query interface extension 422 includes user code associated with a runtime environment that is hosted on the database, such as SQL Server in the example embodiment. As used herein, user code includes executable source code that is not an intrinsic part of the database or database software. User code is typically created by a user and deployed into the database software for execution inside a database server process. As described further herein, user code is created using a programming language and then compiled into executable form using a compiler compatible with the target environment. As described, in the exemplary embodiment, the user code is created and deployed into the database for execution, as described further herein with reference to FIG. 7. The user code, in the form of the query interface extension 422, parses the machine-readable query to ascertain the selected parameters. That is, the query interface extension 422 ascertains the data selection criteria contained in the machine-readable query. In the above example machine-readable query, the selected parameters include CDP_ID, Month, and Count. The CDP_ID identifies a historical data type to retrieve from the data source 402, such as BI data 404 related to a specific counter discount program having the identifier "46." The Month parameter indicates that the data retrieved BI data 404 is to be grouped by month, and the Count parameter indicates that a total count of transactions are included for each month.

At operation 606, the query interface extension 422 determines whether a prediction model is available for the queried dataset. That is, the query interface extension 422 determines whether there is a predictions model, such as AI/ML, models 412, 414, and 416 (shown in FIG. 4), that is configured to execute with the ascertained parameters. The determination is based, at least in part, on required parameter inputs identified for each of the respective prediction models, for example, in metadata associated with each respective prediction model.

If there is no available prediction model, at operation 608, the query interface extension 422 forwards the machine-readable query to the database. At operation 610, the query interface extension 422 obtains the queried data (e.g., the BI data 404) from the data source 402, for example, via the database.

At operation 612, the query interface extension 422 returns the result to the user. Specifically, the query interface extension 422 transmits the result to the query interface 420, which presents the result to the user, for example, via the query application 418. An example result, or query output, based on the above example query is presented below.

| CDP ID | MONTH | COUNT | |
|---|---|---|---|
| 46 | 1 | 29501 | BI data 404 from |
| 46 | 8 | 2569881 | data source 402 |
| 46 | 9 | 177442 | |
| 46 | 10 | 192007 | |
| 46 | 11 | 216197 | |

Referring back to operation 606, if the query interface extension 422 determines that there is at least one prediction model available for the queried dataset, the query interface extension 422 identifies the models(s) and, at operation 614, invokes the ML execution tool 410 using the ascertained selected parameters and the identified prediction model(s). Specifically, the query interface extension 422 transmits the selected parameters to the ML execution tool 410 for generating a prediction result. At operation 616, the query interface extension 422 obtains the prediction result from the ML execution tool 410.

At operation 618, the query interface extension 422 submits the query to the database. In a preferred embodiment, operation 618 can be performed substantially simultaneously with operation 614. Alternatively, operations 614 and 618 can be performed at any predetermined period with respect to each other. At operation 620, the query interface extension 422 obtains the queried data (e.g., the BI data 404) from the data source 402.

At operation 622, the query interface extension 422 appends the prediction result to the obtained, queried data (e.g., the BI data 404), which is from the data source 402, and generates a resultant dataset therefrom. For example, and without limitation, the prediction result includes a prediction based on the same selected parameters ascertained from the original historical data query, i.e., a prediction of a transaction count for a specific month for BI data having a CDP_ID of "46." As such, the prediction result can be appended to the queried data result (e.g., as a list, table, and the like), thereby providing a seamless way to integrate a prediction model with a database server query. In certain embodiments, the appended prediction data is highlighted or otherwise conspicuously identified as prediction data.

The method 700 then returns the result to the user, as indicated above, at operation 612. Specifically, the query interface extension 422 transmits the result to the query interface 420, which presents the result to the user, for example, via the query application 418. An example result, or query output, based on the above example query and appended prediction values is presented below.

| CDP ID | MONTH | COUNT | |
|---|---|---|---|
| 46 | 1 | 29501 | BI data 404 from data source 402 |
| 46 | 8 | 2569881 | |
| 46 | 9 | 177442 | |
| 46 | 10 | 192007 | |
| 46 | 11 | 216197 | |
| 46 | 12 | 145919 | BI data 404 from AI/ML model invoked by the query interface extension 422 |

Deployment of the Query Interface Extension

Figure 7:
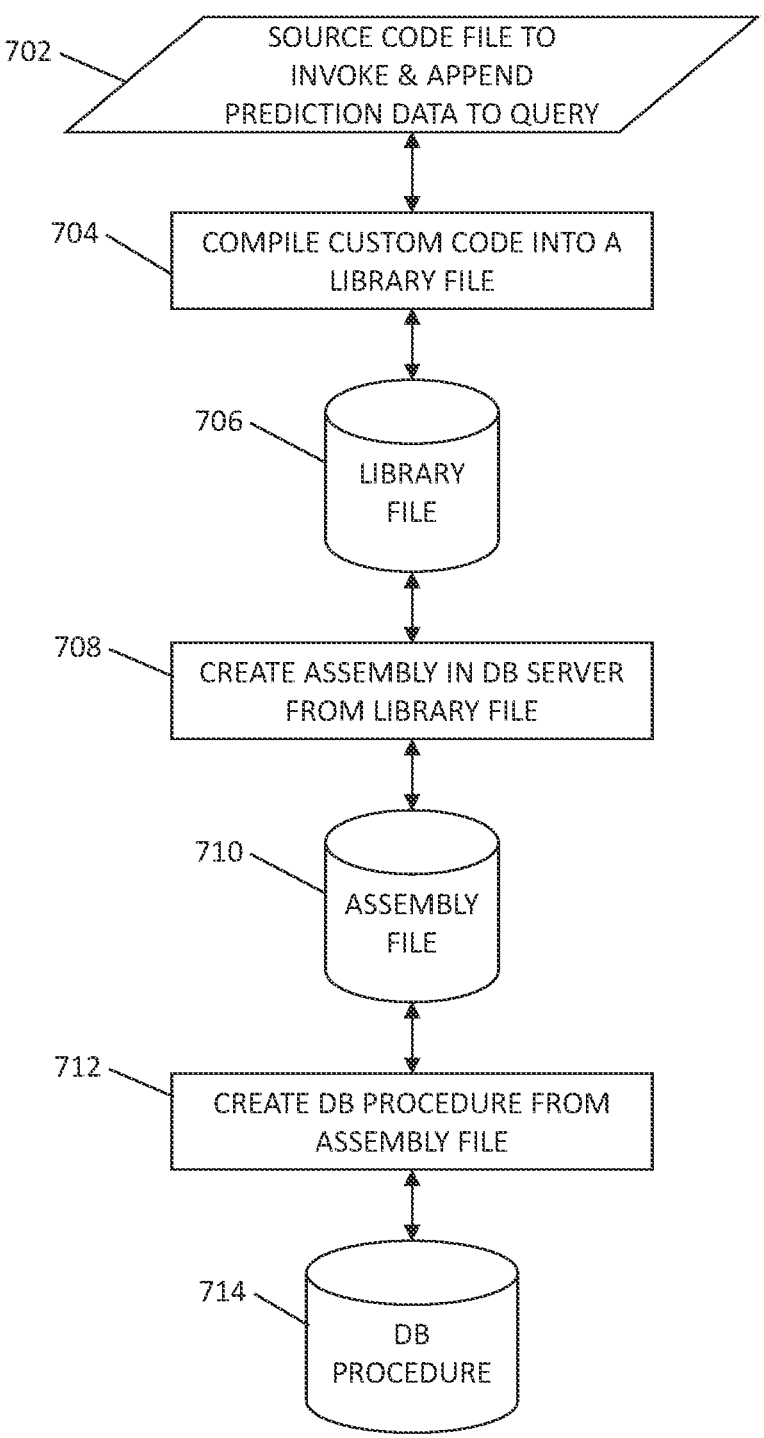
FIG. 7 is a flow diagram depicting deployment of a query interface extension in a database program.

FIG. 7 is a flow diagram depicting the query interface extension 422 (shown in FIG. 4) deployed in a database program. In the exemplary embodiment, the query interface extension 422 is a Common Language Runtime (CLR) database object. The Microsoft Windows .NET Framework provides a run-time environment called CLR, which executes managed code. The phrase "managed code" includes code whose execution is managed by a runtime, such as CLR, and is not specifically a part of the database. CLR is in charge of taking the managed code, compiling it into machine code, and then executing it. CLR is integrated with a variety of databases, including, for example, SQL Server, Oracle, DB2, and PostgreSQL.

CLR provides various functions and services required for program execution, including just-in-time (JIT) compilation, allocating and managing memory, enforcing type safety, exception handling, thread management, and security. With CLR integrated into database software, database developers can perform tasks that are impossible or difficult to achieve with Transact-SQL alone. CLR integration allows developers to write stored procedures, triggers, user-defined types, user-defined functions, and user-defined aggregate functions using any .NET Framework language, including Visual Basic .NET and C#. Both Visual Basic .NET and C#are modern programming languages offering full support for arrays, structured exception handling, and collections. Developers can leverage CLR integration to write code that has more complex logic and is more suited for computation tasks using languages such as Visual Basic .NET and C#.

Referring to FIG. 7, deployment of the query interface extension 422 includes a user source code file 702, which includes user source code to invoke and append prediction data to a database query. The source code includes computer-executable instructions for ascertaining the one or more selected parameters included in a historical data query.

In certain embodiments, the data query may be a fixed query coded as part of a query application 418 (shown in FIG. 4). In other embodiments, the query may be input by a user, including user-selected parameters for querying the BI data 404 stored in the data source 402.

In the exemplary embodiment, the query interface extension 422 is implemented as a CLR stored procedure in SQL Server. Alternatively, the query interface extension 422 may be implemented as a routine, stored procedure, function, and the like in other databases, such as Oracle, DB2, and PostgreSQL. Below is a sample of CLR stored procedure source code of client invoking/submitting a query. The code below is an example, and one of ordinary skill will understand that the source code file 702 may include additional instructions to implement the methods taught herein.

```
public partial class StoredProcedures
{
    [Microsoft.SqlServer.Server.SqlProcedure]
    public static void GetDataWithPrediction ( )
    {
        using (SqlConnection connection = new
SqlConnection("context connection=true") )
        {
            SqlInt32 value = 0;
            connection.Open( );
            SqlCommand command = new
SqlCommand(@"select CDP_ID,Month(crte_DTTM),
count(CDP_ID) from [CDP] . [LOGGING] . [LOGS] where
CDP_ID = 46
group by CDP_ID, Month(crte_DTTM)", connection);
            SqlContext.Pipe.ExecuteAndSend(command);
        }
    }
}
```

The source code file 702 is compiled into a library file at process 704. In the example above, the source code file 702 is written using C#and is saved with the name "GetDataWithPrediction.cs." In the exemplary embodiment, to compile the source code file 702 into a library file for use with SQL Server, the following example command may be executed:

csc/target:library getdatawithprediction.cs

In the above example, the command launches a C#compiler using the /target option to specify building a library DLL file 706. It is noted that various commands may be required by other database software for compiling the source code file 702, as one of ordinary skill would recognize. In the exemplary embodiment, the library DLL file 706 has the file name "GetDataWithPrediction.dll."

At process 708, an assembly 710 is created so the "GetDataWithPrediction" stored procedure is accessible the database. In the exemplary embodiment, to generate the assembly 710, the following example command may be executed:

```
declare @dllPath nvarchar(255) = 'C:\
GetDataWithPrediction.dll'
create assembly CLRPOCDll from @dllPath with
permission_set = external_access;
```

After the assembly 710 is created, the create procedure statement is executed to create a database procedure 714. The database procedure 714, as described herein with reference to FIG. 7, is otherwise referred to throughout the disclosure as the query interface extension 22. In the example embodiment, to create the database procedure 714, the following example command may be executed:

```
CREATE PROCEDURE GetDataWithPrediction
    @i nchar (25) OUTPUT
AS
    EXTERNAL NAME CLRPOCDll . CLRPOCDllProc.CLRPOCDll
```

In the exemplary embodiment, after the database procedure 714 (i.e., "GetDataWithPrediction") has been created, it can be executed like a normal stored procedure written in Transact-SQL. For example, the following example command may be executed to invoke the database procedure 714 (i.e., the query interface extension 422):
exec GetDataWithPrediction '1'

Executing the example query using the database procedure 714 to invoke a query along with a prediction generates the sample output below.

| CDP ID | MONTH | COUNT | |
|--------|-------|---------|---|
| 46 | 1 | 29501 | BI data 404 from |
| 46 | 8 | 2569881 | data source 402 |
| 46 | 9 | 177442 | |
| 46 | 10 | 192007 | |
| 46 | 11 | 216197 | |
| 46 | 12 | 145919 | BI data 404 from AI/ML model invoked by the query interface extension 422 |

While the above description referring to FIG. 7 is described with respect to an exemplary implementation on SQL Server, it is noted that the deployment procedure may be implemented on various other databases with appropriate changes, as required, as will be understood by a skilled artisan.

For example, to implement a substantially similar database procedure 714 in DB2, application developers write the source code of the routine logic in any CLR supported language (e.g., Visual Basic .NET and C#). The source code is then built into an intermediate language (IL) assembly to be executed by the CLR. The assembly is copied into the DB2 function directory on the database server, such as the database server 18 (shown in FIG. 1). In addition, the developer executes the appropriate SQL language CREATE statement for the routine type: CREATE PROCEDURE or CREATE FUNCTION.

In Oracle, the Oracle Database hosts the CLR in an external process but on the same computer. Application developers write .NET stored procedures and functions using any CLR supported language (e.g., Visual Basic .NET and C#), and use the stored procedures in the database, in the same manner as other PL/SQL or Java stored procedures. The application developers build the .NET stored procedures into a .NET assembly. After building .NET stored procedures into a .NET assembly, the application developers deploy the stored procedures in Oracle database. The .NET stored procedure appears to the caller as a PL/SQL stored procedure or function because a PL/SQL wrapper is generated for the stored procedure. The user invokes the .NET stored procedure through this PL/SQL wrapper.

Described herein are methods and systems for a database query interface extension that provides a solution to integrate a prediction model with a database server query mechanism, such as Microsoft SQL server, in such a way that querying data and querying predictions are seamless. One advantage of the above described systems and methods is that existing custom applications can implement artificial intelligence (AI) or machine learning (ML) prediction algorithms without any changes to the custom applications. The invention described herein is transparent to the user. Another advantage is that report developers can integrate predictions into new reports and dashboards with their existing skill set. In addition, the invention described herein is advantageous in that some prediction models can be used by other applications through APIs, etc. and the invention does not restrict access to such prediction models.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A computer system comprising:
 a database storing a plurality of business intelligence (BI) data objects, each BI data object being associated with one or more data parameters;
 a processor; and
 a memory storing thereon one or more prediction models and computer-executable instructions, the computer-executable instructions, when executed by the processor, causing the processor to:
  intercept a data call from a query application to a query interface, the data call comprising a machine-readable query including one or more selected parameters, the one or more selected parameters identifying data corresponding to one or more of the BI data objects;
  parse the data call to ascertain the one or more selected parameters;
  obtain the data corresponding to the one or more BI data objects based on the one or more selected parameters;
  obtain a prediction result from the one or more prediction models based on the one or more selected parameters; and
  append the prediction result to the obtained data.

2. The computer system in accordance with claim 1, further comprising:
 a machine learning execution tool executing on the processor and electronically interfaced with the database, the machine learning execution tool operable to execute the one or more prediction models based on the one or more selected parameters and generate the prediction result based on execution of the one or more prediction models.

3. The computer system in accordance with claim 2, the computer-executable instructions further causing the processor to identify that one or more of the prediction models is executable using the one or more selected parameters.

4. The computer system in accordance with claim 3, the computer-executable instructions further causing the processor to invoke the machine learning execution tool using the one or more selected parameters and the identified one or more prediction models.

5. The computer system in accordance with claim 1, the computer-executable instructions further causing the processor to:
generate a resultant dataset, the resultant dataset comprising the obtained data and the appended prediction result, the appended prediction result being identified as prediction data; and
transmit the resultant dataset to the query interface for presentation via the query application.

6. A computer-implemented method
intercepting a data call from a query application to a query interface, the data call comprising a machine-readable query including one or more selected parameters, the one or more selected parameters identifying data corresponding to one or more BI data objects persisted in a database;
parsing the data call to ascertain the one or more selected parameters;
obtaining the data corresponding to the one or more BI data objects based on the one or more selected parameters;
obtaining a prediction result from one or more prediction models based on the one or more selected parameters; and
appending the prediction result to the obtained data.

7. The computer-implemented method in accordance with claim 6, wherein obtaining the prediction result comprises:
executing one or more of the prediction models based on the one or more selected parameters; and
generating the prediction result based on the execution of one or more of the prediction models.

8. The computer-implemented method in accordance with claim 7, further comprising:
identifying that one or more of the prediction models is executable using the one or more selected parameters; and
invoking a machine learning execution tool using the one or more selected parameters and the identified one or more prediction models.

9. A computer-readable storage medium having computer-executable instructions stored thereon, the computer-executable instructions, when executed by a processor, causing the processor to:
intercept a data call from a query application to a query interface, the data call comprising a machine-readable query including one or more selected parameters, the one or more selected parameters identifying data corresponding to one or more BI data objects persisted in a database;
parse the data call to ascertain the one or more selected parameters;
obtain the data corresponding to the one or more BI data objects based on the one or more selected parameters;
obtain a prediction result from one or more prediction models based on the one or more selected parameters; and
append the prediction result to the obtained data.

10. The computer-readable storage medium in accordance with claim 9, the computer-executable instructions further causing the processor to:
execute one or more prediction models based on the one or more selected parameters; and
generate the prediction result based on the execution of one or more of the prediction models.

11. The computer-readable storage medium in accordance with claim 10, the computer-executable instructions further causing the processor to identify that one or more of the prediction models is executable using the one or more selected parameters, wherein identifying the one or more of the prediction models comprises identifying required parameter inputs for each of the respective one or more prediction models.

* * * * *